United States Patent
Cromer et al.

(10) Patent No.: US 6,357,007 B1
(45) Date of Patent: Mar. 12, 2002

(54) SYSTEM FOR DETECTING TAMPER EVENTS AND CAPTURING THE TIME OF THEIR OCCURRENCE

(75) Inventors: Daryl C. Cromer; Howard Locker, both of Cary; James P. Ward, Raleigh; Michael J. Steinmetz, Cary, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/108,416

(22) Filed: Jul. 1, 1998

(51) Int. Cl.⁷ .......................... G06F 11/34; G06F 12/14
(52) U.S. Cl. .................. 713/194; 713/178; 713/192
(58) Field of Search .................. 713/153, 178, 713/192, 194, 201

(56) References Cited

U.S. PATENT DOCUMENTS

| | | | |
|---|---|---|---|
| 5,287,519 A | | 2/1994 | Dayan et al. ............... 395/700 |
| 5,475,625 A | * | 12/1995 | Glaschick .................... 395/600 |
| 5,552,776 A | | 9/1996 | Wade et al. ............ 340/825.31 |
| 5,712,973 A | * | 1/1998 | Dayan et al. ................ 395/186 |
| 5,919,258 A | * | 7/1999 | Kayashima et al. ........ 713/201 |
| 5,970,227 A | | 10/1999 | Dayan et al. ............... 395/186 |
| 5,991,881 A | * | 11/1999 | Conklin et al. ............. 713/201 |

FOREIGN PATENT DOCUMENTS

EP        0558222        9/1993   ............. G06F/1/00

OTHER PUBLICATIONS

Neuman, M., "Monitoring and Controlling Suspicious Activity in Real–time with IP–Watcher," Proceedings, 11th Annual Computer Security Applications Conference, Dec. 15, 1995, pp. 114–122.*

* cited by examiner

Primary Examiner—Tod Swann
Assistant Examiner—Justin T. Darrow
(74) Attorney, Agent, or Firm—George E. Grosser; Joseph A. Sawyer, Jr.

(57) ABSTRACT

A system for monitoring tamper events in a computer system is disclosed. The computer system is on a network. The system comprises a tamper real time clock (RTC) means which receives at least one tamper event signal from the computer system. The tamper RTC means includes a timer for indicating the time of a tamper event and a management device for receiving the at least one tamper event signal. The management device issues a command to the tamper RTC means to obtain the time of the at least one tamper event. The management device also generates a network packet which includes the time of the tamper event to a system administrator of the network. The present invention in a preferred embodiment is directed to a computer system which has the ability to functionally detect and store the time of a tamper event. A tamper real time clock (RTC) circuit is operatively connected with logic to store the date and time of an event as it occurs. In a preferred embodiment, the tamper event could be as simple as a toggle switch being activated when a cover on the computer system is removed. The computer system could also send network alerts when the cover is removed.

17 Claims, 9 Drawing Sheets

SYSTEM FOR DETECTING TAMPER EVENTS AND CAPTURING THE TIME OF THEIR OCCURRENCE

CROSS-REFERENCE TO RELATED APPLICATION

The present application is related to co-pending application Ser. No. 09/108,479, entitled "Method and System for Detecting an Authorized Tamper Event," filed on the same day and assigned to the same assignee as the present application.

FIELD OF THE INVENTION

The present invention relates to computer systems and portable computer systems and more particularly, to systems for protecting such computer systems from theft or misuse.

DESCRIPTION OF RELATED ART

Personal computer systems are well known in the art. Personal computer systems have attained widespread use for providing computer power to many segments of today's modern society. Personal computers can typically be defined as a desktop, floor standing, or portable microcomputer. Examples of such personal computer systems are IBM's PC series and IBM's Thinkpad Series.

Theft of personal computers and personal computer components is becoming a major industry problem. As a result, there has been an ever increasing need to provide security for computer systems against the unauthorized removal of components and theft thereof. Since modern computer systems and components are generally more compact and more easily transportable, it is even more difficult to provide security measures that prevent unauthorized removal or theft thereof.

In addition, today, computer networks are employed to provide efficient computing capabilities throughout a large work area. Existing computer networks generally include a number of remotely located computer systems coupled via a data link to a server system or a central processing center. The wide dissemination of such systems at remote locations has made the computer systems and computer components an even more accessible target for computer thieves.

Furthermore industry standardization has increased the exchangeability or reusability of components between various types of computer systems from various vendors. The smaller form factor of components such as CPUs, memory, and DASD are popular targets, given their portability and high value. A thief could upgrade a low performance and inexpensive PC with stolen parts to create a high performance and expensive machine.

The precise time of any security event provides invaluable information to security personnel and law enforcement by enabling them to focus their studies of access logs and CCTV tapes to identify the perpetrator. IBM PCs currently carry a tamper detection switch, which can detect when the system cover has been removed and cause the system to be functionally disabled on subsequent boots until the user successfully enters the appropriate password. This mechanism adequately protects the overall system but does not deter theft of components within the system such as DIMMs, HDDs, and CPUs. A common scenario will find a user discovering that their system has memory or a HDD missing but with no way of knowing when precisely the theft took place.

Accordingly, a number of methods have been developed for guarding against the unauthorized removal of computer systems. One such method is the use of Electronic Article Surveillance (EAS) tags are widely used in commercial markets for everything from clothing to Compact Disks. When an item with an EAS tag is carried through a portal, the portal sounds an audible alarm to notify security of a tamper event. The EAS tags are attached or embedded in computer systems to provide a notification of when an asset is removed.

EAS is an excellent technology for retail applications, however it is less effective for protecting assets of a corporation. Employees may have opportunities to defeat the technology such as removing the tags, passing components out though a mail service, or reusing parts within the building.

A number of other methods have been developed for guarding against the unauthorized removal of computer systems. For example, U.S. patent application Ser. No. 08/965,140 U.S. Pat. No. 5,945,915 entitled "Computer System for Sending An Alert Signal Over a Network When A Cover of Said System Has Been Opened" and assigned to the assignee of the present invention discloses a mechanism to notify a system administrator within a network (typically an Ethernet network) when the cover of the computer system is removed through the use of a timestamp. When the cover is removed, an Ethernet subsystem sends a cover tamper signal to the network administrator. The disadvantage to this method is that the timestamp is based on administrator receiving the alert. Given the lossy nature of an Ethernet network the packet may never be received by the system administrator. Another problem is the potential delays inherent in the network, which results in being unable to pin-point the time of the event with accuracy.

There are other methods that provide local protection (non-network based) to detect and prevent unauthorized access to the data stored in a computer system. For example, U.S. Pat. No. 5,388,156, owned by the assignee of the present invention and incorporated herein by reference, discloses a personal computer system having security features enabling control over access to data retained in such a system. The personal computer system has a normally closed enclosure and at least one erasable memory element for receiving and storing a privileged access password (PAP). The PAP is designed to provide protection for the system owner by protecting the initial program load (IPL) device boot list, access to a password utility. The system further includes at least one tamper detection switch mounted within the enclosure and operatively connected with the memory element for detecting opening of the enclosure.

If the enclosure cover of the system is removed by an unauthorized user, the tamper detection switch will change states and set the tamper evident bit. If this occurs, the system will require the PAP to be entered before the user can enter access data. If the PAP is not known, then the system board must be replaced. However, the system of the '156 patent has a disadvantage in that the time in which the cover was removed is not recorded.

It is therefore desirable to provide a computer system that provides a mechanism to accurately record the time when security breaches are detected. The mechanism should work in conjunction with tamper detection mechanisms that are standard in many personal computer systems. The mechanism must be software and configuration independent, to protect against a thief disabling or altering the event. In a preferred embodiment the time of event should be recorded in a secure fashion. The present invention addresses such a need.

SUMMARY OF THE INVENTION

A system for monitoring tamper events in a computer system is disclosed. The computer system is on a network. The system comprises a tamper realtime clock (RTC) means which receives at least one tamper event signal from the computer system. The tamper RTC includes a timer for indicating the time of a tamper event and a management device for receiving the at least one tamper event signal. The management device issues a command to the tamper RTC means to obtain the time of the at least one tamper event. The management device also generates a network packet which includes the time of the tamper event to a system administrator of the network.

The present invention in a preferred embodiment is directed to a computer system which has the ability to functionally detect and store the time of a tamper event. A tamper real time clock (RTC) circuit is operatively connected with logic to store the date and time of an event as it occurs. In a preferred embodiment, the tamper event could be as simple as a toggle switch being activated when a cover on the computer system is removed. The computer system could also send network alerts when the cover is removed.

DETAILED DESCRIPTION OF THE INVENTION

The present invention relates to a system and method for monitoring tamper events in a data processing system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
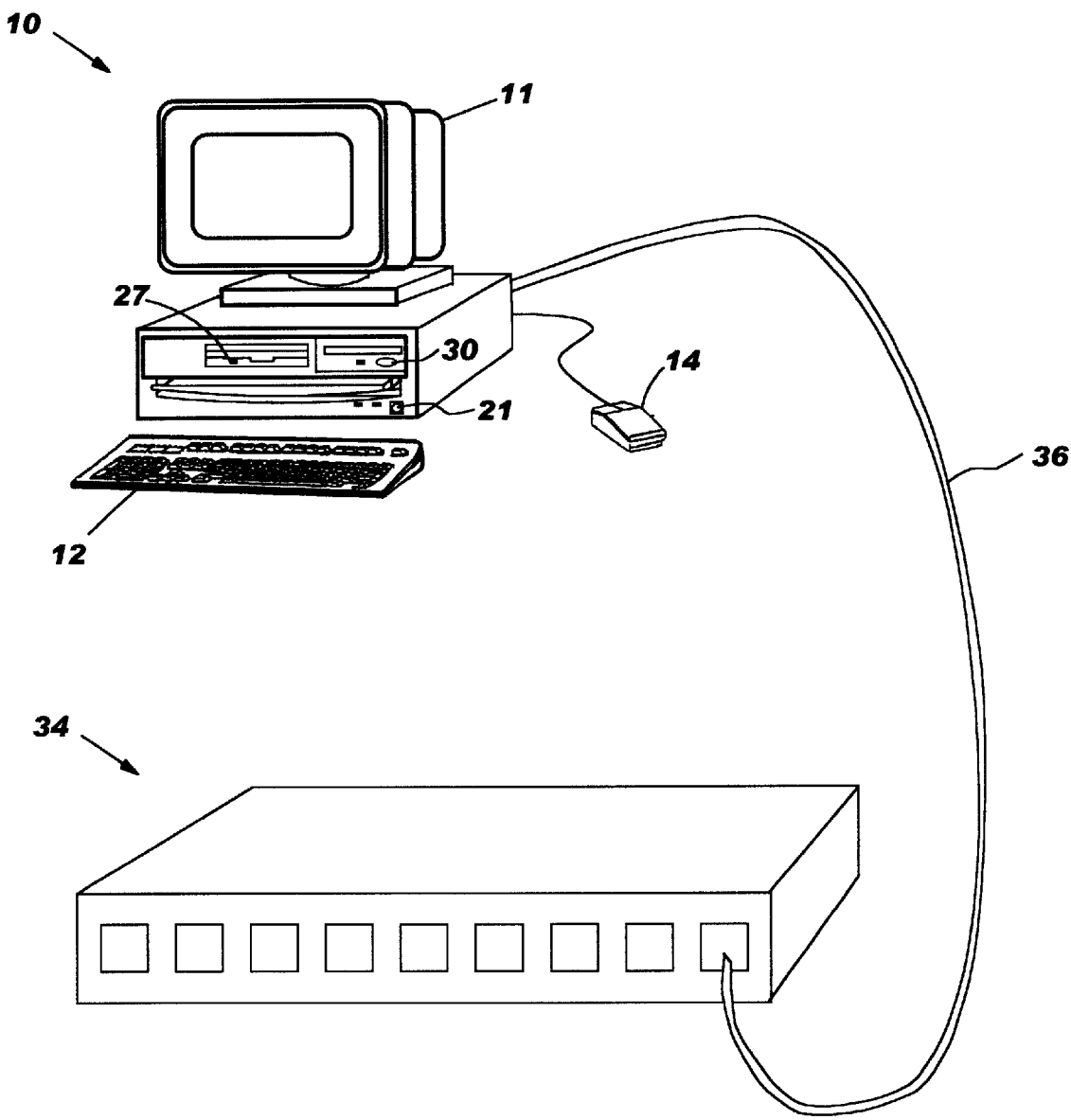
FIG. 1 is a perspective view of a personal computer embodying this invention and a LAN station remote computer system.

Referring now more particularly to the accompanying drawings, a computer system embodying the present invention is there shown and generally indicated at 10 (FIG. 1). As mentioned here in above, the computer 10 may have an associated display monitor 11, keyboard 12, mouse 14, and printer or plotter (not shown). The computer 10 is connected to a network by cable 36, which is connected to a hub 34. The network could be of type Ethernet, Token Ring, ATM, or other mechanism used to transmit data.

Figure 2:
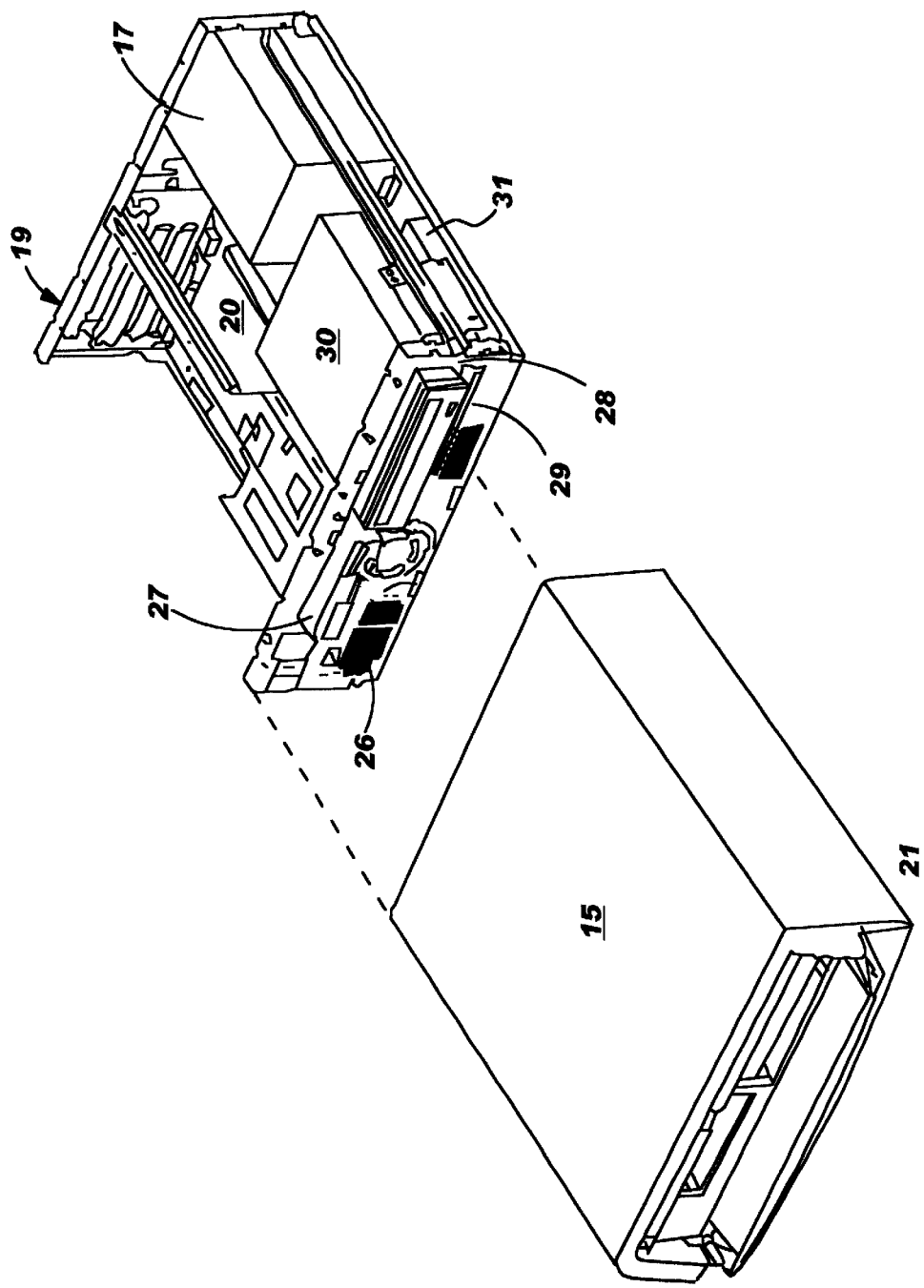
FIG. 2 is an exploded perspective view of certain elements of the personal computer of FIG. 1 including a chassis, a cover, an electromechanical direct access storage device and a planar board and illustrating certain relationships among those elements.

Now referring to FIG. 2, the computer 10 has a cover 15 which is a decorative outer member which cooperates with a chassis 19 in defining an enclosed, shielded volume for receiving electrically powered data processing and storage components for processing and storing digital data. At least certain of these components are mounted on a multi layer planar 20 or motherboard which is mounted on the chassis 19 and provides a means for electrically interconnecting the components of the computer 10 including those identified above and such other associated elements as floppy disk drives, various forms of direct access storage devices, accessory adapter cards or boards, and the like. As pointed out more fully hereinafter, provisions are made in the planar 20 for the passage of input/output signals to and from the operating components of the microcomputer.

The system 10 has a power supply 17, a power button 21, also herein referred to as switch 21. In the illustrated form, the chassis 19 defines a pair of upper bays 26, 28 and a lower bay 29. One of the upper bays 26 is adapted to receive peripheral drives of a first size (such as those known as 3.5 inch drives) while the other 28 is adapted to receive drives of a different size (such as a CD ROM drive) and the lower bay is adapted to receive another drive. One floppy disk drive is indicated at 27 in FIGS. 1 and 2, and is a removable medium direct access storage device (DASD) capable of receiving a diskette inserted there into and using the diskette to receive, store and deliver data as is generally known. One CD ROM drive is indicated at 30 in FIGS. 1 and 2 and is a removable medium direct access storage device capable of receiving a compact disc inserted there into and using the disc to deliver data as is generally known. One hard disk drive is indicated at 31 in FIG. 2 and is a fixed medium direct access storage device capable of storing and delivering data as is generally known.

Figure 3:
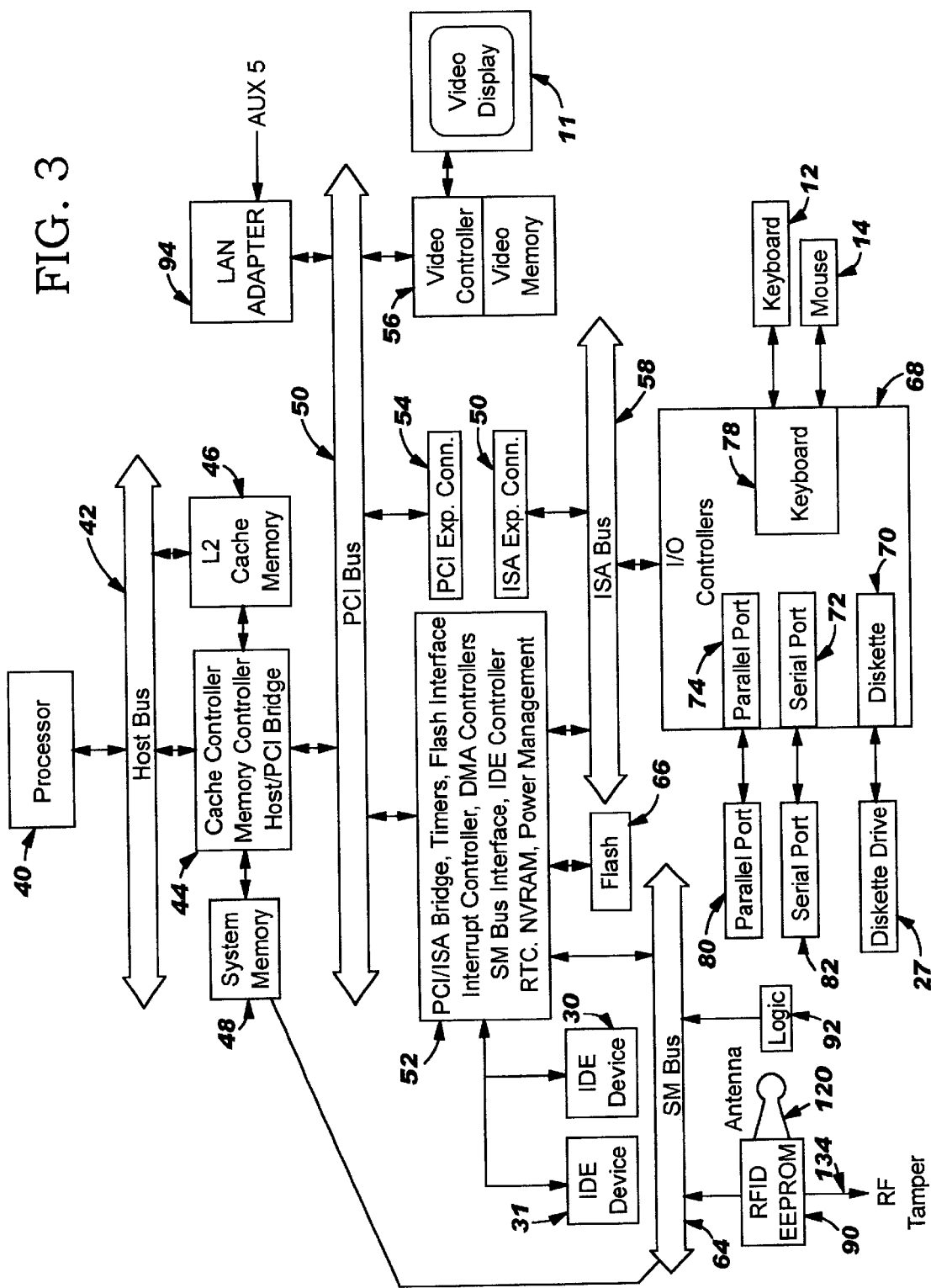
FIG. 3 shows a block diagram of certain components of the personal computer of FIGS. 1 and 2.

Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with the present invention, including components mounted on the planar 20 and the connection of the planar 20 to the IO expansion connectors and other hardware of the personal computer system. Connected to the planar 20 is the system CPU or processor 40, which is connected directly to a high speed CPU host bus 42. A first system core logic chipset 44 and L2 cache memory 46 are also connected to the host bus 42. The first core logic chipset 44 includes a memory control unit, a L2 cache controller and a peripheral component interconnect (PCI) bridge. The memory control unit is further connected to a volatile random access memory (RAM) 48. The RAM memory 48 is composed of one or more memory modules. The memory controller includes the logic for mapping addresses to and from the microprocessor 40 to particular areas of RAM 48. The cache controller is operatively coupled to the L2 cache memory 46.

The first core chipset 44 can be, for example, a Triton VX chip which is sold by Intel Corporation. The PCI bridge within chipset 44 provides an interface between the local bus 42 and a PCI bus 50. Connected to the PCI bus 50 is a second core chipset 52 and a plurality of PCI expansion connectors 54 for receiving PCI bus compatible peripheral cards. One such peripheral card is a video controller 56. The video controller 56 includes video memory and is coupled to the monitor or video display terminal 11. The chipset 52 can be, for example, a PIIX4 chip which is also sold by Intel Corporation.

The chipset 52 contains a bus control and timing unit, a plurality of timers, an interrupt controller, a direct access memory (DMA) unit, nonvolatile CMOS RAM, also herein referred to as NVRAM, a CMOS real-time clock (RTC), an System Management (SM) bus controller, a PCI/ISA bridge, flash memory interface, power management logic and an integrated drive electronics (IDE) controller. The PCI/ISA bridge provides an interface between the PCI bus 50 and an optional feature or expansion bus such as the Industry Standard Architecture (ISA) bus 58. Connected to the ISA bus 58 are a plurality of ISA expansion connectors 60 for receiving ISA adapter cards (not shown). The IDE controller provides for the attachment of IDE compatible storage devices such as the fixed disk drive 31 and CD-ROM drive 30.

The system real-time clock is used for time of day calculations and the NVRAM is used to store system configuration data. That is, the NVRAM will contain values which describe the present configuration of the system 10. For example, NVRAM 52 contains information describing the type of fixed disk or diskette, the list of IPL devices set by a user and the sequence to be used for a particular power on method, the type of display, the amount of memory, time, date, etc. Furthermore, these data are stored in NVRAM whenever a special configuration program, such as configuration/setup, is executed. The purpose of the configuration/setup program is to store values characterizing the configuration of the system to NVRAM. Attached to core 52 is a flash memory (FM) module or chip 66.

Power management circuitry 52 is for changing the system 10 between various power states (e.g., off, standby, sleep, suspend and normal operating states). The present invention will operate in any of these power states. Accordingly, the description that follows will be independent of power state.

Coupled to the ISA bus 58 is a multi-function IO controller 68 such as, for example, a National Semiconductor PC87307. The IO controller 68 contains a variety of IO adapters and other components such as the diskette adapter 70, serial adapter 72, a parallel adapter 74 and keyboard controller 76. The diskette adapter 70 provides the interface to the diskette drive 27. The serial adapter 72 has an external port connector 82 for attachment of external devices such as a modem (not shown). The parallel adapter 74 has an external port connector 80 for attachment of external devices such as printers (not shown). The keyboard controller 76 is the interface for the keyboard 12 and the mouse 14.

A LAN adapter or subsystem 94 can be coupled to either the PCI bus 50 or the ISA bus 58 for allowing system 10 to communicate with a LAN via a connection or link 36 to hub 34 (FIG. 1). The LAN adapter is supplied with auxiliary power (AUX5) from the power supply 17 when the system 10 is off. The LAN adapter can be, for example, an IBM Auto ALERT-ON LAN token ring adapter.

A planar SM Bus 64 is coupled to the PCI bus 50 and ISA bus 58 via chipset 52. The planar SM Bus 64 is an additional IO bus in system 10 and is used as a local bus to support slow speed peripheral devices that reside on the planar board. Logic 92 which will be described later is coupled to SM bus 64.

RFID (Radio Frequency Identification) EEPROM 90 is also coupled to the SM Bus 64 and an RF interface. In a preferred embodiment, the RFID EEPROM 90 is a dual ported non-volatile memory element with both a digital serial (12C) and Radio Frequency interface. The non-volatile EEPROM includes asset information such as serial numbers and code revision for the system. The RFID EEPROM can be updated through a digital interface that connects to the SM bus 64 or through the RF interface which connects to antenna 120.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor 40 could be an Intel Pentium processor, Cyrix 586-P75 processor or Advanced Micro Devices 586 processor or by any other suitable microprocessor.

The microcomputer system 10 is shown with 16 megabytes of system memory 48. It is understood that additional memory can be interconnected as represented in FIG. 3 by installing additional or higher-density memory modules. For purposes of illustration only, the present invention is described with reference to the 16 megabyte memory configuration.

Referring back to FIG. 1, there is shown the local computer system 10 along with a perspective view of some form of LAN attachment through hub 34, in which effective communication may be established through electrically conductive connections, through fiber optical links, through infrared or other radiation links, or in other manners. Such a link is indicated in FIG. 1 at 36. The network may be a token-ring network or an Ethernet network, or other known type of network. Each of the computers may be a "personal computer" as defined herein. Alternatively, the remote computer on the LAN may be some computer having capabilities other than those ascribed herein to a "personal computer", and possibly beyond those capabilities. While the term "remote" is used with reference to the computer system through which the LAN station local computer system 10 accesses BIOS, that term is used in the sense of indicating separation, rather than in the sense of indicating a large physical distance between the systems. In fact, such system may be physically adjacent in some network arrangements.

The present invention is directed to a computer system, which has the ability to functionally detect and record the time of a tamper event. The triggering events are tamper events detected by the computer system. In a preferred embodiment, the tamper event could be as simple as a toggle switch being activated when the cover of the personal computer is removed. The computer system could also includes a tamper detection switch mounted within the enclosure and operatively connected with a logic unit to retain the time of the tamper event.

The personal computer could also send network alerts when the cover is removed. The computer system can also be coupled to a remote computer via a data communication link. A management tamper real time clock (RTC) is operatively connected with logic to obtain and send the time of the event as part of the network alert.

In addition IBM has introduced personal computer systems with Radio Frequency Identification (RFID) technology. The RFID technology enables the personal computer to detect the removal of the system from an office or building.

Given a building with portals at exits, the system when passing through the electromagnetic field of the portal registers an event. The RF signal is operatively coupled with logic to retain the time of the event.

In the preferred embodiment, the tamper events are operatively connected to logic that contains a duplicate of the system's RTC. This duplicate RTC herein referred to as a tamper RTC contains a shadow of the system RTC but can be stopped by a tamper event. The hardware real time clock is powered by system battery to eliminate reliance on AC power being present. The tamper RTC is setup by Power On Self Test (POST) or a network administrator to ensure synchronization with the system RTC. Security of the timer setup is limited by requiring a user to enter a Privilege Access Password (PAP) to gain access.

When the system is powered on, POST checks to ensure the various tamper indicators are clear. If a tamper has occurred, it then prompts the user for a PAP. The system will not continue to boot or enter setup until the PAP is entered. If POST checks the duplicate RTC and no events have occurred, it will check synchronization between the system RTC and the duplicate RTC. POST is designed to either correct the duplicate RTC or provide an error code depending on the network. A system and method in accordance with the present invention provides for recording the date and time of the tamper event within the system such that security personnel can focus their investigation most effectively.

Figure 4:
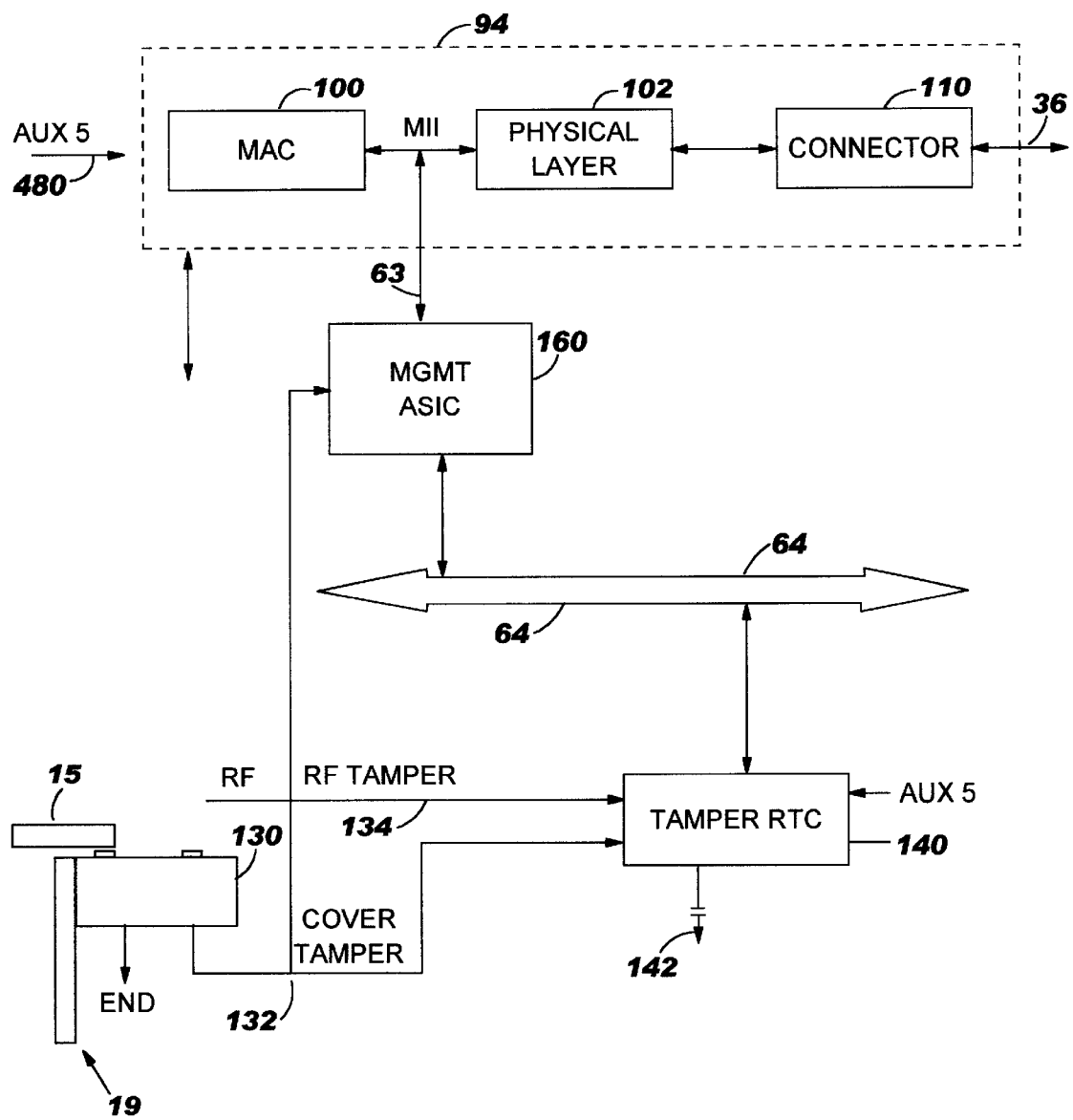
FIG. 4 is a simplified block diagram of a system in accordance with the present invention.

A preferred embodiment of the present invention will now be described with reference to FIGS. 3 and 4. FIG. 4 is a simplified block diagram of a system 90 in accordance with the present invention. The system includes a LAN adapter 94. The LAN adapter 94 includes a Media Access Controller (MAC) 100. The MAC 100 serves as an interface between a shared data path (e.g., media independent interface (MII) (described below) and a PCI bus 50 or ISA bus 58. The MAC 100 performs a number of functions involved in the transmission and reception of data packets. For example, during the transmission of data, the MAC 100 assembles the data to be transmitted into a packet with address and error detection fields. Conversely, during the reception of a packet, the MAC 100 disassembles the packet and performs address checking and error detection. In addition, the MAC 100 typically performs encoding/decoding of digital signals transmitted over the shared path and performs preamble generation/removal as well as bit transmission/reception. The MAC 100 can be for example, an Intel 82557 chip.

The LAN adapter 94 further includes a media independent interface (MII) which is a local bus between the MAC 100 and a physical layer 102. The physical layer 102 in a preferred embodiment implements a fully compliant IEEE 802.3u MII for connection to MACs. The IEEE 802.3u MII is a specification of signals and protocols which formalizes the interfacing of a 10/100 Mbps Ethernet Media Access Controller to the underlying physical layer 102.

The physical layer 102 in a preferred embodiment can be a fully integrated device supporting 10 and 100 Mb/s CSMA/CD Ethernet applications. The physical layer 102 receives parallel data from the MII local bus and converts it to serial data for transmission over cable 36. The physical layer 102 is also responsible for wave shaping and provides analog voltages to cable 36. The physical layer 102 can be for example, an Integrated Services Systems 1890 chip. The physical layer 102 also in a preferred embodiment includes auto-negotiation logic which has three main purposes. The first purpose is to determine the capabilities of the hub 34. A second purpose is to advertise its own capabilities to the remote computer 34. Finally, a third purpose of the physical layer 102 is to establish a connection with the remote computer 34 using the highest performance common connection technology.

Figure 5:
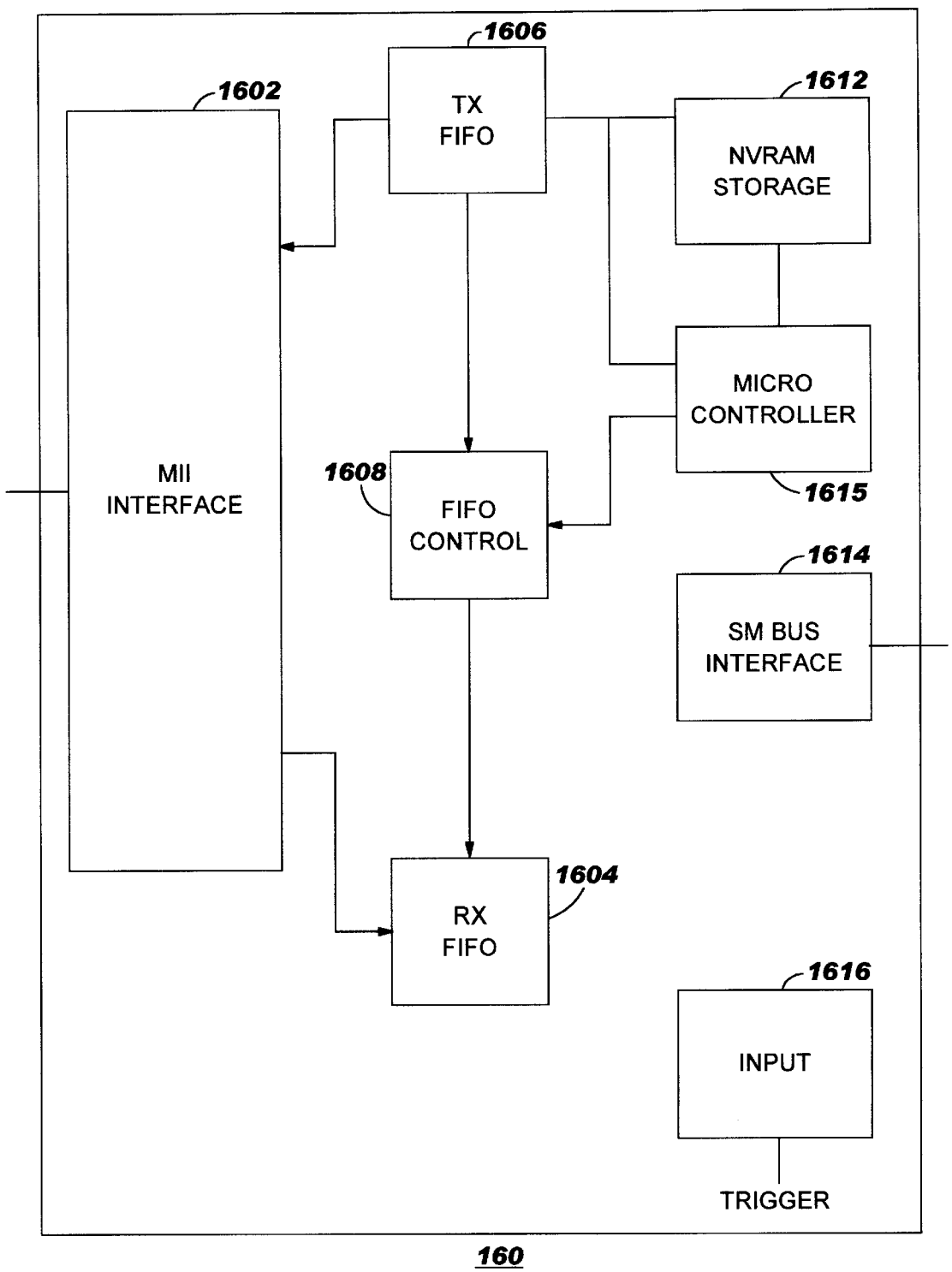
FIG. 5 is a block diagram of the management application specific integrated circuit (ASIC) utilized in the system of FIG. 4.

A management application specific integrated circuit (ASIC) 160 is coupled between the MII bus 63 and the SM bus 64. Referring now to FIG. 5, what is shown is a block diagram of one embodiment of the management ASIC 160. The management ASIC 160 includes a MII interface 1602 for receiving and sending data from a RX FIFO 1604 and TX FIFO 1606. The FIFOs 1604 and 1606 are controlled by FIFO controller 1608. The FIO controller 1608 in turn is coupled to a microcontroller 1618 and NVRAM storage 1612. The NVRAM storage 1612 includes the packet header information. The management ASIC 160 also includes a SM interface 1614 which receives data from the SM bus 64. The functionality of the management ASIC 160 will be described in more detail later in the specification.

Referring again to FIG. 4, a tamper real time clock (RTC) circuit 140 is also provided which communicates with the management ASIC 160 via the SM bus 64. The tamper RTC 140 is also coupled to a battery 142 to keep power on the tamper RTC even if the computer loses power. The tamper RTC circuit 140 also receives tamper event signals. In this example, the tamper events are a cover tamper or an RF tamper (which will be described later in the specification). However, one of ordinary skill in the art will readily recognize that other types of tamper events could trigger the tamper RTC circuit 140.

Figure 6:
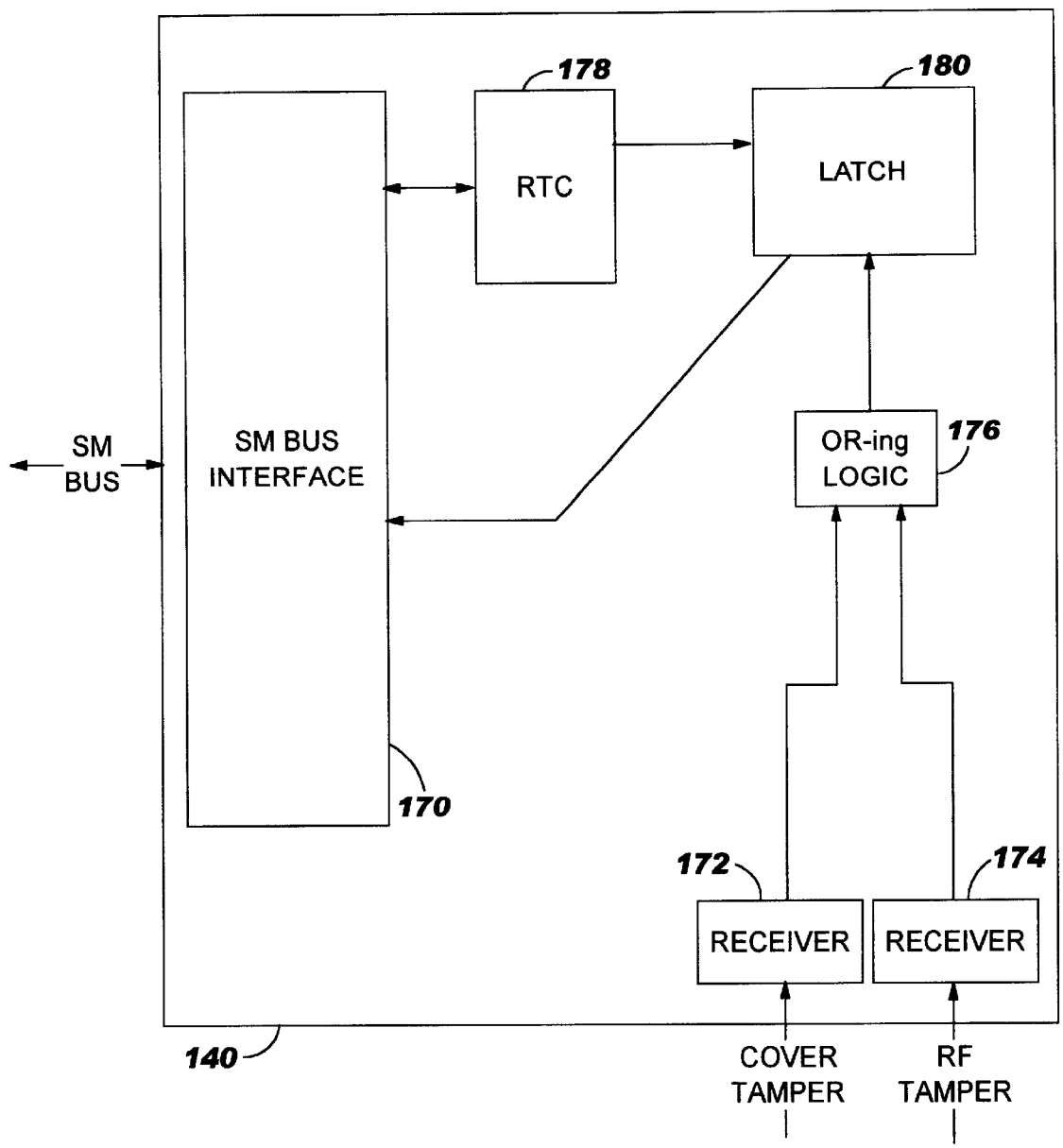
FIG. 6 is a block diagram of the tamper RTC circuit utilized in FIG. 4.

FIG. 6 is a block diagram of the tamper RTC circuit 140. The tamper RTC 140 includes a SM bus interface 170 used by management ASIC 160 or by a power on reset signal to gain access to the tamper RTC circuit 140. The system bus interface 170 communicates with a real time clock 178 and a latch 180. The latch 180 receives tamper event signals 132 and 134 via receivers 172 and 174 through a logic circuit 176.

Accordingly when the tamper RTC circuit 140 receives either a cover tamper event signal 132 or a RF tamper event signal 134, the contents of RTC 178 are transferred and held in latch 180. The time stamp for latch 180 can then be read by software via the SM bus interface 170. In addition, when a LAN Leash tamper is detected by management ASIC 160, it then drives a request to tamper RTC circuit 140 to obtain the time stamp. In response to a request for a time stamp from management ASIC 160, RTC 140 sends the contents for RTC 178 to SM bus interface 170, over the SM bus 64 to management ASIC 160.

Referring back to FIG. 4, the management ASIC 160 receives the cover tamper signal. The management ASCI 160 duplicates the function of the MAC 100 to send alert packets to the physical layer 102. When an event occurs such as a cover tamper signal 132 or an RF tamper signal 134 the management ASIC 160 creates an event packet and sends a predefined message to a system administrator. In the preferred embodiment of the present invention, the management ASIC 160 obtains a timestamp for the event packet by issuing a command to the tamper RTC circuit 140 on the SM bus 64. The management ASIC adds the timestamp to the packet and generates a network packet. A network packet 200 is illustrated by FIG. 7.

Figure 7:
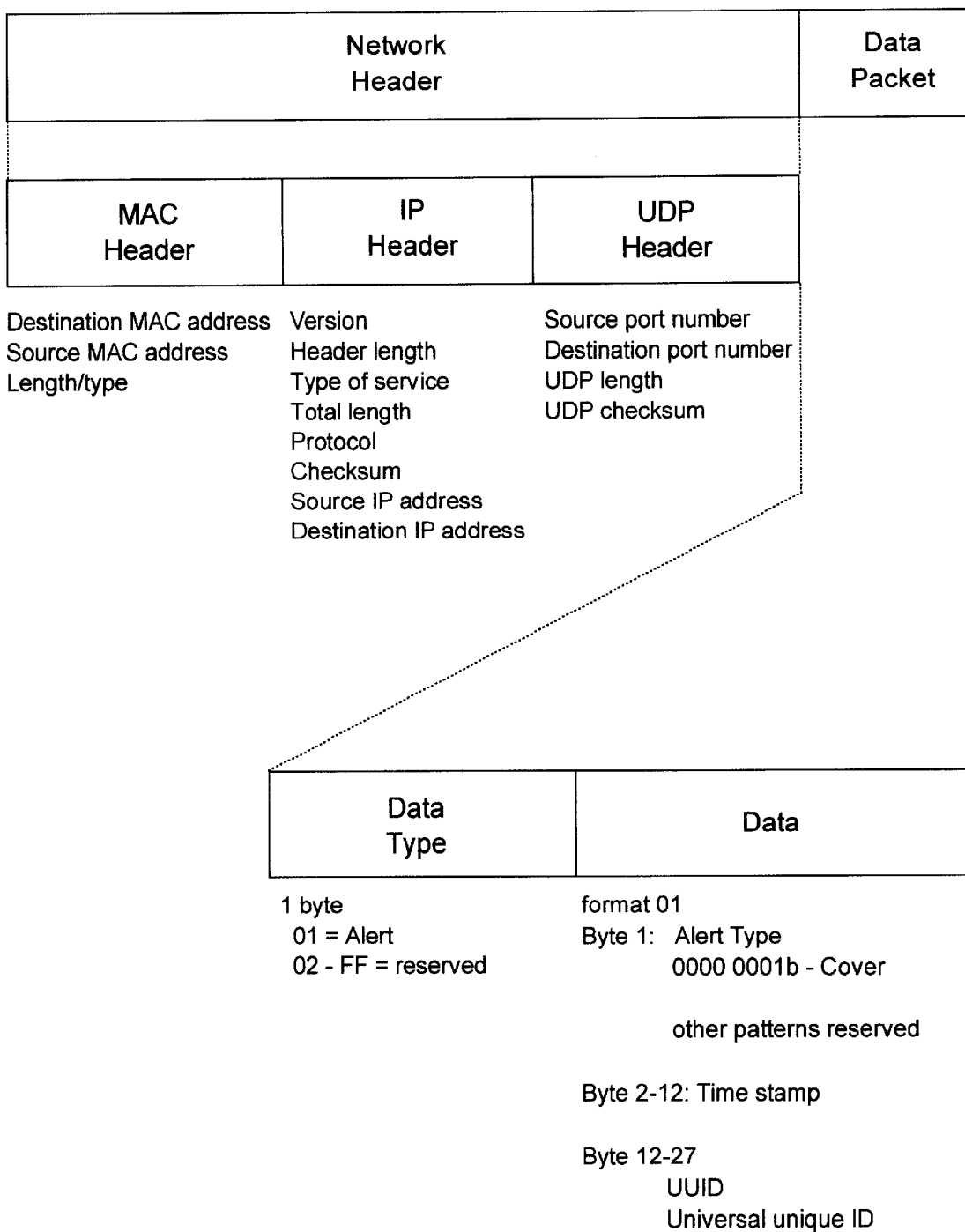
FIG. 7 illustrates the type of packet that could be sent by management ASIC of FIG. 5.

Referring now to FIG. 7, the network packet 200 comprises a header section 202 and a data section 204. The header section 202 contains in a preferred embodiment, internet, UDP, and MAC headers. The data section 204 in a preferred embodiment comprises the type of event, timestamp, and universal unique identification (UUID). The timestamp provides the critical information for determining when a tamper event has occurred.

Referring back to FIG. 4, the LAN adapter 94 further includes a connector 110 such as a RJ45 connector which is the physical interface between the adapter 94 and cable 36. An alternative embodiment to the LAN adapter 94 could be, for example, a LAN connector or connection embedded or integrated on the planar 20. The LAN connector could also include all the same connections and components as the adapter 94. In addition, the MAC 100 and Physical layer 102 could be combined into a signal chip. The connection to Management ASIC 160 could be MII bus or other type of bus. Finally, another option is combining the Management ASIC 160 into the single chip MAC and physical layer.

As has been before mentioned, a first type of tamper event could be a switch connected to the chassis of the computer. In this embodiment, as seen in FIG. 4, a toggle switch 130 is connected to chassis 19 in a manner such that when the cover 15 is used to enclose the unit the toggle switch 130 is closed. When the cover 15 is removed the toggle switch 130 changes position indicating the cover has been removed on the cover tamper signal 132. The cover tamper signal 132 is connected to the tamper RTC 140, which results in a tamper RTC 140 latching or holding the current value of the clock.

Figure 8:
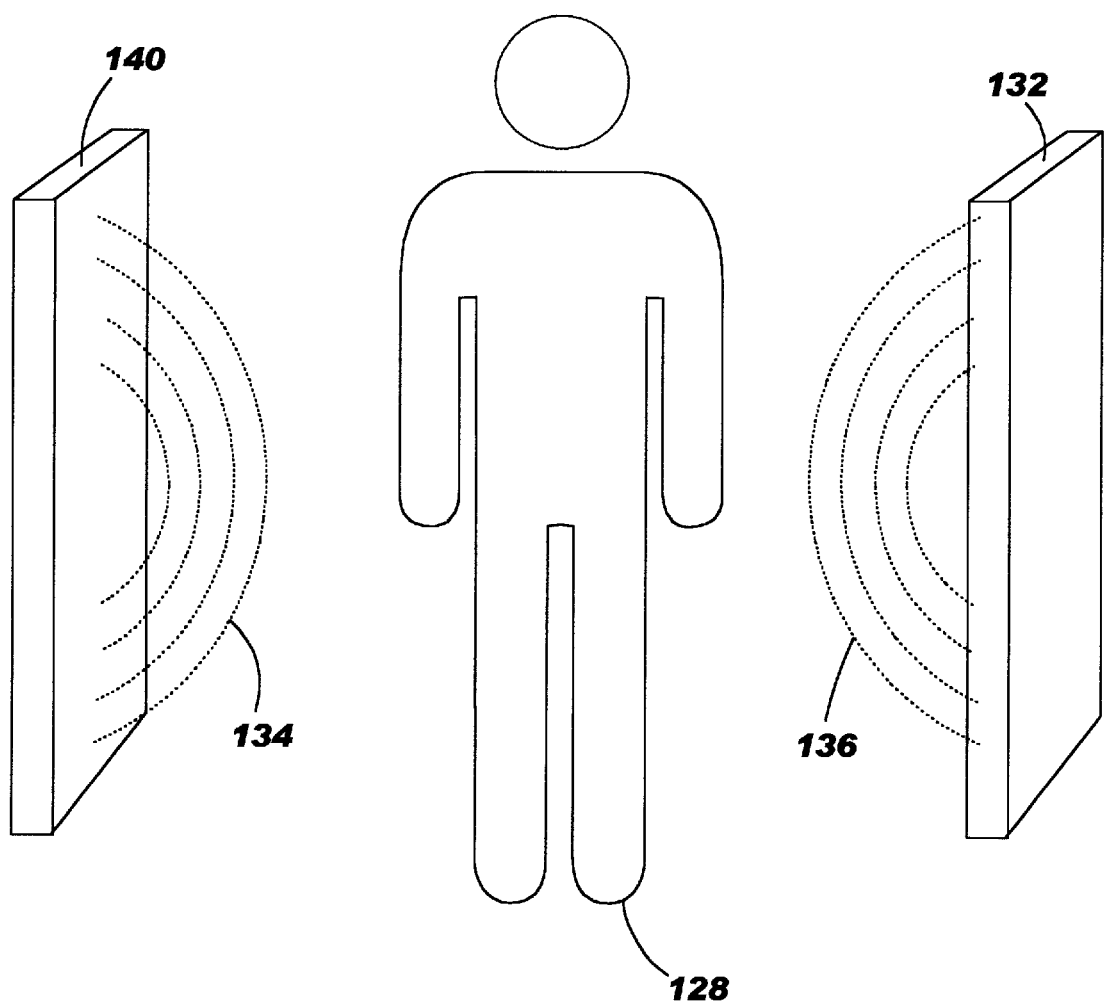
FIG. 8 illustrates a person carrying a computer system through portals of a room or building.

A second type of tamper event is when a computer is removed from a building or room. Now referring to FIG. 8, which illustrates a person 128 carrying machine 12 through portals 130 and 132 which are located in a building or room. The portal 130 and 132 emit a continuous RF field 134 and 136. When the RFID EEPROM 90 in the computer detects the presence of the field, it sends a RF tamper signal 134 to an input of tamper RTC circuit 140 (FIG. 4), which results in the tamper RTC circuit 140 latching or holding the current value of the clock.

In a preferred embodiment, the tamper RTC circuit 140 is initialized and synchronized by power on self test (POST) via the SM bus 64. Programming of the counter is handled by system POST/BIOS during system initialization and is OS independent. In addition, in a preferred embodiment the programming requires use of Privilege access password (PAP) to ensure a system administrator only change values. When one of the tamper events occur to system 12, the tamper RTC circuit 140 is triggered to latch or hold the current value of the RTC 178. The tamper RTC circuit 140 is backed up by battery 142.

Figure 9:
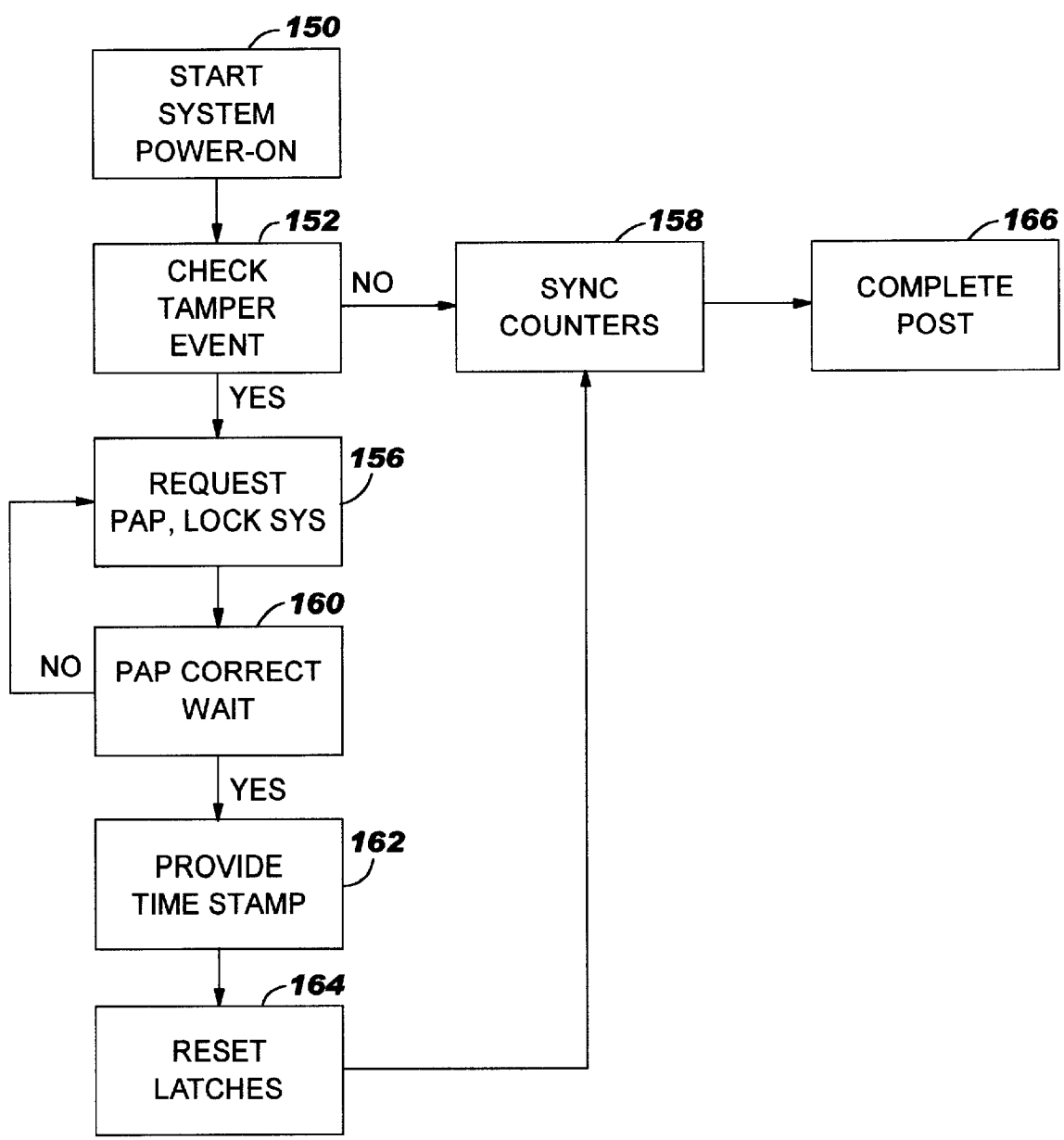
FIG. 9 is a flow diagram of operation of the system in accordance with the present invention.

FIG. 9 is a flow diagram of the operation of the system. When the system is turned on, via step 150, Power On Self Test (POST) checks the tamper RTC circuit 140 to determine if a tamper event has occurred, via step 152. If there are no tamper events the system RTC 52 (FIG. 3) and the duplicate RTC 140 are synchronized, via step 150. If a tamper event occurred, then POST locks the system and displays a message indicating need to enter PAP, via step 156 and waits for a password, via step 156. After a password is entered POST provides access to timestamp information in RTC circuit 140. After the access it then resets receivers 172 and 174, via step 164 and resynchronizes system RTC circuit 52 to the tamper RTC circuit 140 via step 158.

Accordingly, a system and method in accordance with the present invention provides a computer system, which has the ability to functionally detect and record the time of a tamper event. The triggering events are tamper events which can be detected by the computer system. In a preferred embodiment, the tamper event could be as simple as a toggle switch being activated when the cover of the personal computer is removed.

The computer system in a preferred embodiment includes a tamper detection switch mounted within the enclosure and operatively connected with a logic unit to retain the time of the tamper event. The personal computer in a preferred embodiment also sends network alerts when the cover is removed. The computer system can also be coupled to a remote computer via a data communication link. A tamper real time clock (RTC) circuit is operatively connected with logic to obtain and send the time of the event as part of the network alert.

Although the present invention has been described in accordance with the embodiments shown, one of ordinary skill in the art will readily recognize that there could be variations to the embodiments and those variations would be within the spirit and scope of the present invention. For example, one could modify the system RTC such that upon detection of the tamper event the contents of the system RTC could be transferred to a non-volatile memory, the contents could then be read by software. The management ASIC 160 could also read the system RTC to obtain the time stamp if the RTC had an SM bus interface. In addition, the RTC could provide numerous non-volatile memory devices to store numerous events. In addition to the time stamp, the source of the event would also be stored. Accordingly, many modifications may be made by one of ordinary skill in the art without departing from the spirit and scope of the appended claims.

What is claimed is:

1. A system for monitoring tamper events in a computer system, the computer system being on a network; the system comprising:

a tamper real time clock (RTC) means for receiving at least one tamper event signal originating from the computer system; the tamper RTC means including a timer for indicating the time of a tamper event; and a management device for receiving the at least one tamper event signal; the management device issuing a command to the tamper RTC means to obtain the time of the at least one tamper event, the management device generating a network packet which includes the time of the tamper event to a system administrator of the network, wherein the monitoring system is internal to the computer system.

2. The system of claim 1 wherein the receiving means comprises a real time clock (RTC) circuit.

3. The system of claim 1 wherein the receiving means comprises a system real-time clock (RTC) including a nonvolatile memory for retaining the tamper event.

4. The system of claim 1 wherein the tamper event signal comprises a cover tamper signal.

5. The system of claim 1 wherein the tamper event signal comprises a radio frequency tamper signal.

6. The system of claim 1 wherein the time of a tamper event comprises a time stamp.

7. The system of claim 2 wherein the tamper RTC circuit comprises:

at least one receiver means for receiving a tamper event signal;

a latch means for receiving the tamper event signal from the at least one receiver means;

a real time clock (RTC) for receiving a signal from the latch means, whereby the RTC transfers timestamp information to the latch means when the RTC receives the signal from the latch means; and an interface means for allowing the management device to gain access to the real timestamp information.

8. The system of claim 7 which further includes an adapter means coupled to the management device, and the adapter means for providing tamper event information to the network.

9. A system for monitoring tamper events in a computer system, the computer system being on a network; the system comprising:
 a LAN adapter means; the LAN adapter means including a media access controller, the media access controller for providing an interface between a shared data path and a local bus;
 a tamper real time clock (RTC) means coupled to a system bus for receiving at least one tamper event signal originating from the computer system and latching the at least one tamper signal based upon a tamper event, the tamper RTC means including means for retaining the time of the tamper event; and
 a management device coupled between a local bus and the system bus within the computer system; the management device for receiving the at least one tamper event signal and sending an alert packet to the LAN adapter means based upon the at least one tamper event, the alert packet including the time of the tamper event; the alert packet being obtained by issuing a command to the tamper RTC means;
 wherein the monitoring system is internal to the computer system.

10. The system of claim 9 wherein the alert packet includes timestamp information.

11. The system of claim 9 wherein the tamper event signal comprises a cover tamper signal.

12. The system of claim 9 wherein the tamper event signal comprises a radio frequency tamper signal.

13. The system of claim 9 wherein the tamper RTC means comprises a system RTC including a nonvolatile memory for retaining the time of the tamper event.

14. A system for monitoring tamper events in a computer system, the system comprising:
 a system real time clock (RTC) circuit;
 a tamper RTC circuit for receiving at least one tamper event signal originating from the computer system, wherein the tamper RTC circuit can be stopped by the at least one tamper event signal;
 means for checking the tamper RTC circuit to determine whether a tamper event has occurred;
 means for locking the computer system if a tamper event has occurred;
 means for obtaining timestamp information from the tamper RTC circuit if a tamper event has occurred; and
 means for resynchronizing the tamper RTC circuit to the system RTC circuit.

15. The system of claim 14, wherein the means for checking comprising a power on self test (POST).

16. The system of claim 14, wherein the means for obtaining further comprising:
 means for requesting a user to enter a privilege access password (PAP); and
 means for verifying the entered PAP prior to providing the timestamp information.

17. A method for monitoring tamper events in a computer system, the computer system being on a network, the method comprising the steps of:
 (a) providing a tamper real time clock (RTC) means for receiving at least one tamper event signal;
 (b) providing a management device coupled to the tamper RTC means for receiving the at least one tamper event signal;
 (c) receiving at least one tamper event signal originating from the computer system in the tamper RTC means and the management device;
 (d) retaining a time of the tamper event signal in the tamper RTC means;
 (e) obtaining the time of the tamper event signal by the management device upon command to the tamper RTC means;
 (f) generating a network packet by the management device, the network packet including the time of the tamper event signal; and
 (g) transmitting the network packet to a system administrator of the network.

* * * * *